US006124225A

United States Patent [19]
Tien et al.

[11] Patent Number: 6,124,225
[45] Date of Patent: *Sep. 26, 2000

[54] CUTTING TOOLS AND WEAR RESISTANT ARTICLES AND MATERIAL FOR SAME

[75] Inventors: Tseng-Ying Tien; Zhen-Kun Huang, both of Ann Arbor, Mich.

[73] Assignee: The Regents of the University of Michigan, Ann Arbor, Mich.

[*] Notice: This patent is subject to a terminal disclaimer.

[21] Appl. No.: 09/124,658

[22] Filed: Jul. 29, 1998

[51] Int. Cl.⁷ .................................................. C04B 35/599
[52] U.S. Cl. ......................................... 501/98.2; 264/668
[58] Field of Search ................................ 501/98.2, 98.3; 264/668

[56] References Cited

U.S. PATENT DOCUMENTS

| | | |
|---|---|---|
| 4,547,470 | 10/1985 | Tanase et al. . |
| 4,563,433 | 1/1986 | Yeckley et al. . |
| 4,826,791 | 5/1989 | Mehrotra et al. . |
| 4,845,059 | 7/1989 | Mehrotra et al. . |
| 4,851,205 | 7/1989 | Mitomo ................................. 501/98.2 |
| 4,873,210 | 10/1989 | Hsieh . |
| 4,880,755 | 11/1989 | Mehrotra et al. . |
| 4,913,936 | 4/1990 | Mehrotra et al. . |
| 5,120,682 | 6/1992 | Ukyo et al. . |
| 5,120,687 | 6/1992 | Hsieh . |
| 5,122,317 | 6/1992 | Chen et al. . |
| 5,227,346 | 7/1993 | Hwang et al. . |
| 5,238,885 | 8/1993 | Asayama et al. . |
| 5,264,297 | 11/1993 | Jindal et al. . |
| 5,312,785 | 5/1994 | Pyzik et al. . |
| 5,316,988 | 5/1994 | O'Brien et al. . |
| 5,370,716 | 12/1994 | Mehrotra et al. . |
| 5,413,972 | 5/1995 | Hwang et al. . |
| 5,468,696 | 11/1995 | Ishizawa et al. . |
| 5,580,510 | 12/1996 | Tien et al. . |

FOREIGN PATENT DOCUMENTS 1092637  11/1967  United Kingdom .

OTHER PUBLICATIONS

Hardie, D. and Jack, K.H., Crystal Structures of Silicon Nitride, *Nature*, 180, 332–22 (1957).
Lange, F.F., Relation Between Strength Fracture Energy, and Microstructure of Hot–Pressed $Si_3N_4$, *J. Am. Ceram. Soc.*, 56 [10] 518–22 (1973).
Hampshire, S., Park, H.K., Thompson, D.P., and Jack, K.H., α'SiAlON ceramics, *Nature*, 274, 880–82 (1978).
Lange, F.F., Fracture Toughness of $Si_3N_4$ as a Function of the Initial α–Phase Content, *J. Am. Ceram. Soc.*, 62 [7–8] 428–30 (1979).
Lewis, M.H., Fung, R., and Taplin, D.M.R., Indentation Plasticity and Fracture of $Si_3N_4$ Ceramic Alloys. *J. Mater. Sci.*, 16, 3437 (1981).
Becher, P.F., Microstructure Design of Toughened Ceramics, *J. Am. Ceram. Soc.*, 74 [2] 255–69 (1991).
Cao, et al., "α'–SiAlON Ceramics: A Review," *Chem. Mater.*, 3, 242–252 (1991).

Ekström, T. and Nygren, M., SiAlON Ceramics, *J. Am. Ceram. Soc.*, 75 [2] 259–76 (1992).
Jack, "SiAlON Ceramics: Retrospect and Prospect," *Mat. Res. Soc. Symp. Proc.*, vol. 287, pp. 25–27 (1993).
Katz, "Applications of Silicon Nitride Based Ceramics in the U.S.," *Mat. Res. Soc. Symp. Proc.*, vo. 287 , pp. 197–208 (1993).
Lai, K–R and Tien, T–Y, "Kinetics of β–$Si_3N_4$ Grain Growth in $Si_3N_4$ Ceramics Sintered Under High Nitrogen Pressure," *J. Am. Ceram. Soc.* 76[1] 91–96 (1993).
Hoffman, "Analysis of Microstructural Development and Mechanical Properties of $Si_3N_4$ Ceramics," Tailoring of Mechanical Properties of $Si_3N_4$ Ceramics (M.J. Hoffman and G. Petzow (eds.)), pp. 59–72 (1994).
Padture, "In Situ–Toughened Silicon Carbide," *J. Am. Ceram. Soc.*, 77[2], 519–23 (1994).
Sheu, "Microstructure and Mechanical Properties of the In–Situ β–$Si_3N_4$/α'–SiAlON Composite," *J. Am. Ceram. Soc.*, 77[9], 2345–53 (1994).
Mitomo et al., "Fine–Grained Silicon Nitride Ceramics Prepared from β–Power," *J. Am. Ceram. Soc.*, 78[1], 211–14 (1995).
Riedel, R., Kleebe, H–J., and Schonfelder, H., A covalent micro/nanocomposite resistant to high–temperature oxidation, *Nature*, 374, 526–28 (1995).
Hwang, C.J., Susintzky, D.W., and Beamna, D.R., Preparation of Multication α'SiAlON Containing Strontium, *J. Am. Ceram. Soc.*, 78 [3] 588–92 (1995).
Shen et al., "Temperature Stability of Samarium–Doped α'SiAlON Ceramics," *J. Euro. Ceram. Soc.*, 16[1], 43–53 (1996).
Shen et al., "Ytterbium–stabilized α'SiAlON ceramics," *J. Physics D: Applied Phys.*, 29[3], 893–904 (1996).
Riedel, R. Kienzie, A., Dressler, W., Ruwisch, L., Bill, Jr., and Aldinger, F., A silicoboron carbonitride ceramic stable to 2,000 degree C, *Nature*, 382, 796–86 (1996).
Wang, H., Cheng, Y–B., Muddle, B.C., Gao, L., and Yen, T.S., Preferred orientation in hotpressed Ca α'SiAlON ceramics, *J. Mater. Sci. Lett.*, 15, 1447–49 (1996).
Shen, Z., Ekström, T., and Nygren, M., Temperatures Stability of Samarium–Doped α'SiAlON Ceramics, *J. Eur. Ceram. Soc.*, 16 43–53 (1996).
Shen, Z., Ekström, T., and Nygren, M., Ytterbium–stabilized α'SiAlON ceramics, *J. Phys. D: Appl. Phys.*, 296, 893–904 (1996).
Nakayasu, T., Yamada, T., Tanaka, I., Adachi, H., and Goto, S., Electronic Structures of $Ln^{3+}$α'SiAlONs with Correlations to Solubility and Solution Effects, *J.Am. Ceramic. Soc.*, 79, [10] 2527–32 (1996).

(List continued on next page.)

Primary Examiner—Karl Group
Attorney, Agent, or Firm—Dobrusin Darden; Thennisch Law Firm PLLC

[57] ABSTRACT

A ceramic having a relatively high proportion of an alpha prime SiAlON phase and exhibiting high hardness and toughness. In a particularly preferred embodiment, a cation of Gd is used as a modifying cation.

32 Claims, 2 Drawing Sheets

OTHER PUBLICATIONS

Shen, Z., Ekström, T., and Nygren, M., Homogeneity Region and Thermal Stability of Neodymium–Doped α'SiAlON Ceramics, *J. Am. Ceram. Soc.,* 79, 721–32 (1996).

Shen, Z., Nordberg, L–O Nygren, M., and Ekström, T., "α'SiAlON Grains with High Aspect Ration—Utopia or Reality," *Proc. Nato AST Engineering Ceramics '96—Higher Reliability through Processing,* Ed. Babini, G.N., Kluwer Acad. Publ., Dordrecht, Netherlands, 169–78 (1997).

Nordberg, L–O, Shen, Z., Nygren, M., and Ekström, T., On the Extension of the α'SiAlON Solid Solution Range and Anisotropic Grain Growth in Sm–Doped α'SiAlON Ceramics, *J. Eur. Ceram. Soc.,* 17, 575–80 (1997).

Huang, Z.K., Jiang, Y.Z., Tien, T.Y., "Formation of α–SiAlONx with Dual Modifying Cations (Li+Y and Ca+Y)," *J. Mat'ls. Sci. Letters,* vol. 16, pp. 747–751 (1997) and circumstances.

Thompson, Derek, "Tough Cookery" *Nature,* vol. 389, p. 675 (1997).

Chen, I–Wei and Rosenflanz, Anatoly, "A tough SiAlON ceramic based on α–$Si_3N_4$ with a whisker–like microstructure," *Nature,* vol. 389, pp. 701–704 (1997)(presented at Ceramic Society Meeting May 5–7, 1997).

Rosenflanz, Anatoly Zhanovich, "α'–SiAlON: Phase Stability, Phase Transformations and Microstructural Evolutions" Dissertation (1997).

International Search Report, International Application No. PCT/US97/21263, filed Nov. 21, 1997.

Chen, I–Wei and Rosenflanz, Anatoly, Serial 08/753,359, filed Nov. 25, 1996, titled In–Situ Toughened Alpha Prime–SiAlON–Based Ceramics (RFG Ref. No. 65306–001).

The Regents of the University of Michigan, International Application No. PCT/US97/21263, filed Nov. 21, 1998, titled "In–Situ Toughened Alpha Prime–SiAlON–Based Ceramics" (RFG Ref. No. 65306–002).

α'(R)-SiAlON s.s. plane in the R-Si-Al-O-N systems

α'(R)-SiAlON region at 1800°C

CUTTING TOOLS AND WEAR RESISTANT ARTICLES AND MATERIAL FOR SAME

GOVERNMENT SUPPORT STATEMENT

This application was made with government support under grant #DE-AC05-84OR2140. The government has certain rights in the invention.

BACKGROUND OF THE INVENTION

1. Technical Field

The present invention relates to cutting tools and articles having high wear resistance, which are prepared from silicon nitride-based ceramic systems, and more particularly, to silicon nitride-based ceramic systems having a relatively high proportion of alpha prime SiAlON, exhibiting relatively high hardness, toughness, and strength and being prepared from alpha silicon nitride starting materials.

2. Discussion

Silicon nitride materials currently occupy an important and growing portion of the market for materials for many commercial applications. It has become an increasingly important material, for instance, in the cutting tool and bearing industries, and continues to receive attention in the automotive component market. As compared with conventional materials, such as carbide-based materials or steel materials (e.g., M-50), silicon nitride generally offers the potential advantages of relatively high heat resistance and chemical stability, relatively low density, good mechanical properties such as hardness and toughness, and good electrical insulation characteristics. To illustrate the advantages, in the context of the cutting tool industry, these properties can combine in whole or in part to allow operations to proceed at higher speeds and temperatures, with resulting potential cost savings. The potential for the above properties and others also makes silicon nitride an attractive material (and its uses are believed to be under exploration) for other applications, such as without limitation, extrusion dies and automotive components (e.g., without limitation, turbocharger components, swirl chambers, engine valve or valve train components, etc.).

As persons skilled in the art are aware, there are two widely recognized groups of silicon nitride ($Si_3N_4$) ceramics. One group is referred to as alpha silicon nitride ("$\alpha$-$Si_3N_4$"). The other group is referred to as beta silicon nitride ("$\beta$-$Si_3N_4$"). Beta silicon nitride has been the material of choice for cutting tools. Solid solutions of silicon nitride, in which some of the Si—N bonds are replaced by Al—O bonds and which often include other metallic elements, are known as SiAlON materials.

Further details of the characteristics of these groups of nitrides, and their solid solutions in SiAlON systems can be found in commonly owned co-pending application Ser. No. 08/753,359, and PCT/US 97/21263, hereby expressly incorporated by reference. Until the inventions that are the subject matter of that patent application Ser. No. 08/753,359, and this application, it was previously not believed that the combination of properties were obtainable wherein the resulting material comprised a relatively high portion of alpha-prime SiAlON and exhibited a hardness of at least 19 GPa and indentation toughness of at least about 5 MPa•m½.

SUMMARY OF THE INVENTION

The articles, processes, and materials of the present invention are characterized by a resulting relatively high proportion of an alpha-prime SiAlON phase (i.e., greater than any other phase present, and preferably greater than about 50% by weight of the total phase composition), and also by the presence of an elongated rod shape grain structures comprising at least a portion of alpha prime SiAlON phase. The materials are capable of exhibiting a hardness of about 20 GPa, an indentation toughness of at least about 7 MPa•m½ and a room temperature strength of about 800 MPa. The materials are further characterized by inclusion of a modifying cation selected from the group consisting of cations of Nd, Sm, Gd, Dy, Yb, Y and mixtures thereof, and more preferably a cation of Gd in an amount such that $\alpha'(R)SiAlON$ grains are obtained having the formula $R_{m/3}Si_{12-(m+n)}Al_{(m+n)}O_nN_{16-n}$, with m ranging from 0.9 to about 3.2, and more preferably about 1.0 to about 2.4, and n ranging from about 0.4 to about 1.8, and more preferably about 0.5 to about 1.5. In a preferred embodiment, a cutting tool is fabricated to include the materials of the present invention.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings:

DETAILED DESCRIPTION OF THE PREFERRED EMBODIMENT

In a preferred embodiment, a cutting tool is fabricated by preparing a preferred material and machining it to the desired shape of the desired cutting tool.

The preferred material of the present invention is a ceramic compound that is characterized as including an alpha prime SiAlON phase present in an amount of at least about 45% by weight of the final material, preferably greater than about 55% by weight of the final material, still more preferably greater than about 70% by weight of the final material, and still more preferably greater than about 90% by weight of the final composition. The remaining portion of the material may include one or more additional phases, such as without limitation, glass phase, beta SiAlON, AlN polytypoids (e.g., selected from 5H, 27R, 21R, 12H, 15R or mixtures thereof) and other compounds, such as melilite, garnet or mixtures thereof.

Figure 1:
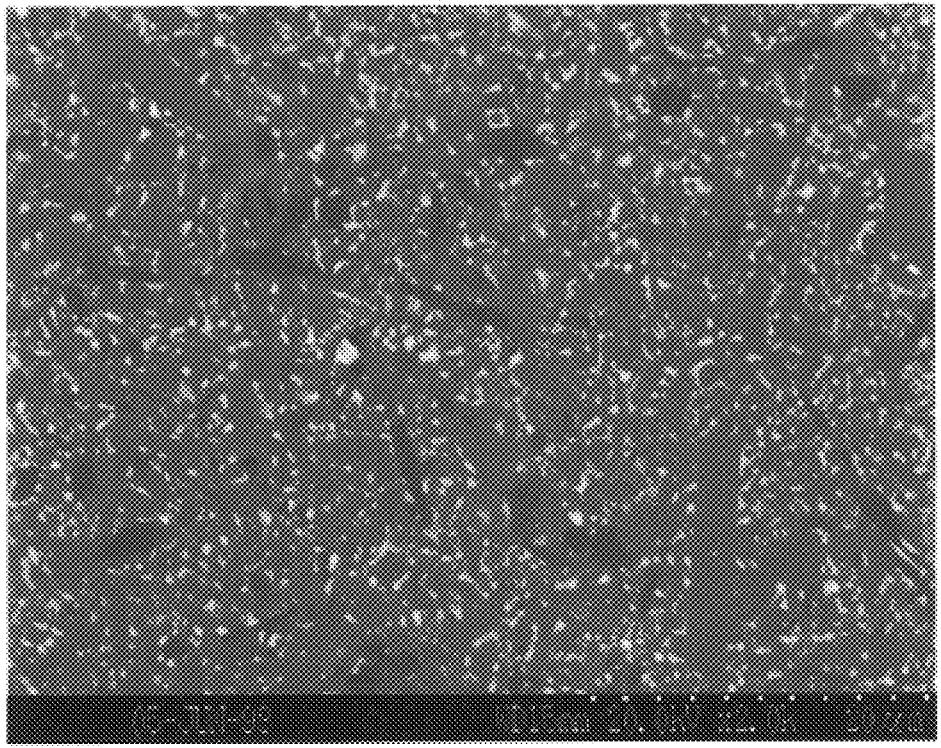
FIG. 1 is a micrograph of a first sample prepared according to the present invention.
Figure 2:
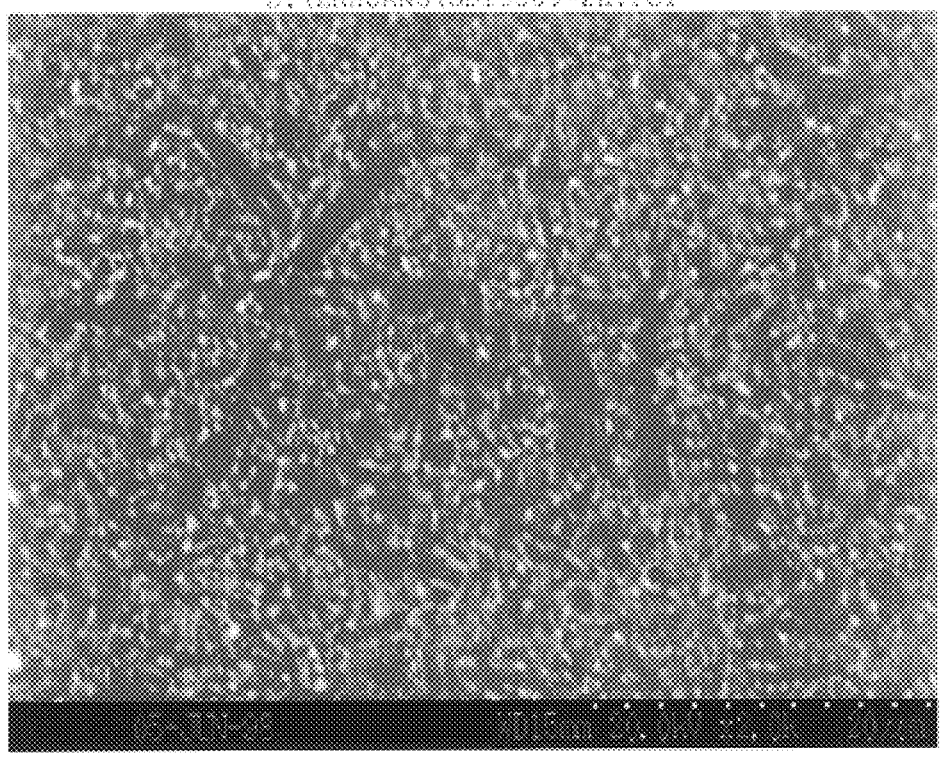
FIG. 2 is a micrograph of a second sample prepared according to the present invention.

The preferred material is also characterized by the presence of a plurality of elongated rod shaped grains, a major portion of which is alpha prime SiAlON. The grains preferably have an average diameter ranging from about 0.5 micron to about 2.5 microns, and more preferably about 0.5 micron to about 1.5 microns. FIGS. 1 and 2 illustrate examples of representative embodiments of the present invention, and show typical microstructure and distribution of grains. They are not intended as limiting the scope of the present invention.

The material of FIG. 1 is prepared in accordance with the procedures discussed herein and in the Examples (relative to Sample I.D. No. Gd1212). FIG. 1 shows a plurality of elongated alpha prime-SiAlON grains having an average diameter of about 1.0 micron, and an average aspect ratio of about 7:1. In this embodiment, additional phases are present including beta-SiAlON and glass. Beta SiAlON is present in an amount of about 10 volume %, and is revealed generally as the black or darkest grains in FIG. 1. The alpha prime-SiAlON is present in an amount of about 80 volume %. A majority of the grains have a diameter of about one micron or greater. The skilled artisan would readily glean additional microstructural information from the micrograph of FIG 1.

FIG. 2 illustrates an example of another representative embodiment of the present invention, and shows a typical microstructure and distribution of grains. The material of FIG. 2 is prepared in accordance with the procedures discussed herein and in the Examples (relative to Sample I.D. No. Gd13509). FIG. 2 shows a plurality of elongated alpha prime-SiAlON grains having an average diameter of about 1.2 microns, and an average aspect ratio of about 6:1. In this embodiment, additional phases are present including glass (shown generally as the white grain-boundary phase). The alpha prime SiAlON is present in an amount of about 95 volume %, and is revealed as the gray grains in FIG. 2. The skilled artisan would readily glean additional microstructural information from the micrograph of FIG. 2.

When employed in combination, the preferred ratio, by weight, of alpha prime SiAlON to beta SiAlON is about 80:20, and more specifically is about 83:17. Moreover, as seen, other alpha prime SiAlON grains may also be present in the phase, such as equiaxed grains.

The preferred final material is also characterized as having a hardness (Vickers) greater than about 19, and more preferably greater than about 20 GPa. Moreover, the preferred final material has an indentation toughness ($K_{IC}$) of at least about 6.0 MPa•m½, and more preferably at least about 6.5 MPa•m½, and still more preferably at least about 7 MPa•m½.

The preferred final material preferably contains at least one modifying cation (R) selected from the group consisting of Nd, Sm, Gd, Dy, Yb, Y, and mixtures thereof. The resulting alpha prime phase is further characterized as having the formula $R_{m/3}Si_{12-(m+n)}Al_{(m+n)}O_nN_{16-n}$. In one particularly preferred embodiment, the modifying cation preferably is Nd, Gd, or mixtures thereof, m ranges from about 0.9 to about 1.35 (and more preferably about 1.2) and n ranges more preferably about 0.9 to 1.2. In another particularly preferred embodiment, the modifying cation preferably is Gd, m ranges from about 1.6 to about 2.4 and more preferably about 1.8 to about 2.2, and n ranges more preferably about 0.9 to about 1.2. In yet another particularly preferred embodiment, the modifying cation is Yb with m ranging from about 2.7 to about 3.2 and more particularly about 2.7 to about 3.0 and n ranges from about 1.3 to about 1.8 and 1.4 to about 1.6.

Figure 4:
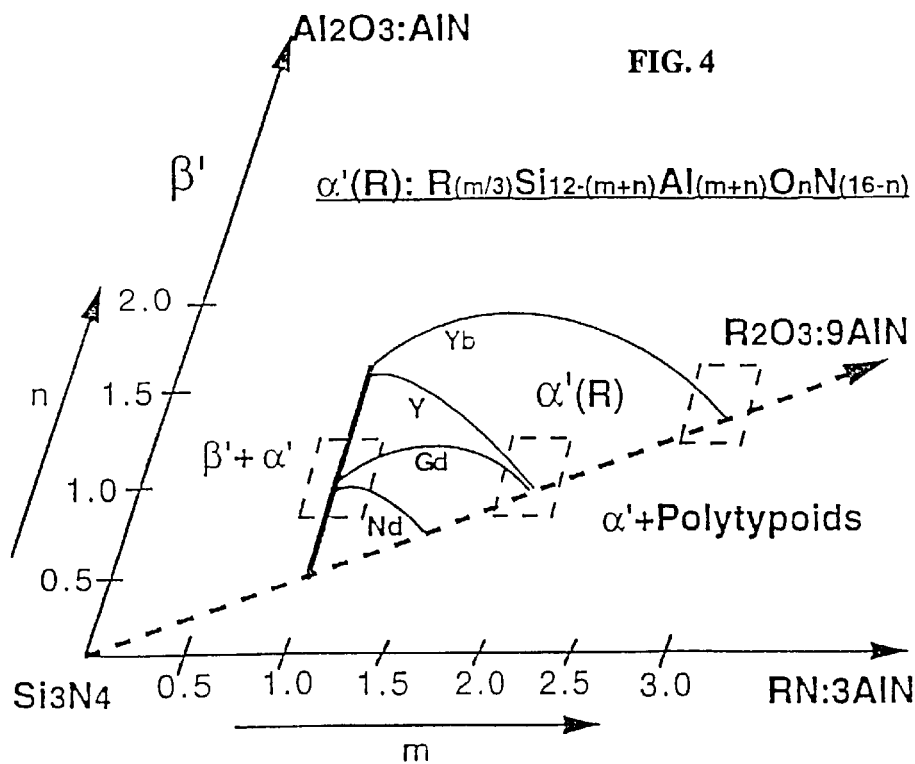
FIG. 4 is a phase diagram depicting $\alpha'$-SiAlON solid solution compositions for $\alpha'$: $R_{(m/3)}Si_{12-(m+n)}Al_{(m+n)}O_nN_{(16-n)}$.

Using the diagram of FIG. 4, the skilled artisan may be able to arrive at other compositions exhibiting correspondingly similar properties. FIG. 4 is a phase diagram depicting α'-SiAlON solid solution compositions for α': $R_{(m/3)}Si_{12-(m+n)}Al_{(m+n)}O_nN_{(16-n)}$. It shows the composition regions of easier forming elongated R-alpha prime-SiAlONs (R=Nd, Gd, Yb and Y, see dashed areas). The curved lines in this Figure delineate the alpha prime SiAlON single phase region for different R elements. The parallel graph outlines one preferred embodiment for this application.

Figure 3:
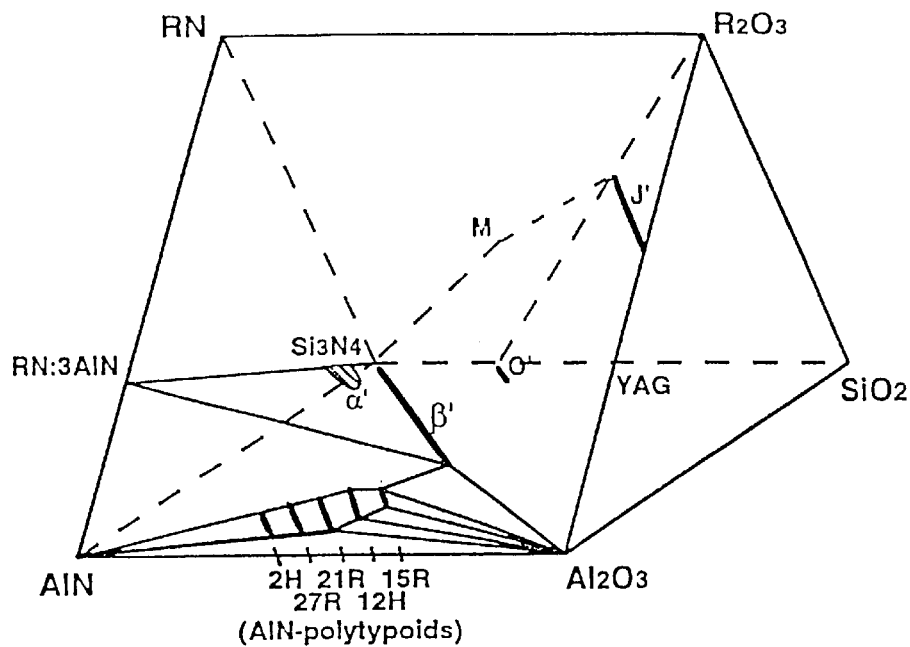
FIG. 3 is a phase diagram depicting the alpha prime (R)—SiAlON solid solution plane in the R—Si—Al—O—N system.

With further reference to FIGS. 3 and 4, for certain light rare earth modifying cations (e.g., of Nd, Sm, and Gd), the formation of elongated alpha prime (R) grains occurs adjacent the lower solubility limit border of alpha prime-SiAlON region and often in the two phase region compatible with beta-SiAlON. For certain heavier rare earth modifying cations (e.g., of Dy, Yb, and Y), the formation of elongated alpha prime (R) grains occurs in the two phase region generally compatible with AlN polytypoids. At high temperatures, the formation of elongated alpha prime-SiAlON grains often occurs in the two phase region in the presence of liquid.

The material of the present invention is prepared by a process including the steps of:

1) providing starting materials;
2) forming a green body including the starting materials; and
3) densifying the green body to form a densified material.

In a preferred embodiment, the starting materials for the present invention include:

(a) alpha silicon nitride ($\alpha$-$Si_3N_4$).
(b) aluminum nitride (AlN);
(c) alumina ($Al_2O_3$); and
(d) at least one oxide compound $R_2O_3$, wherein R is a cation of an element selected from the group consisting of Nd, Sm, Gd, Dy, Yb, Y and mixtures thereof in an amount sufficient to yield in the resulting material an alpha prime SiAlON phase having the formula $R_{m/3}Si_{12-(m+n)}Al_{(m+n)}O_nN_{16-n}$, with m ranging from about 0.9 to about 3.2, and more preferably about 1.0 to about 2.4, and n ranging from about 0.4 to about 1.8, and more preferably about 0.5 to about 1.5.

When the starting materials of the immediate preceding paragraphs are used, the resulting elongated grains preferably are composed of both alpha prime SiAlON and beta SiAlON, which used in combination is believed to afford higher toughness, higher hardness, and higher strength than that of ceramics containing either alpha prime SiAlON or beta SiAlON alone.

When used, like the other starting materials, the oxide compound $R_2O_3$ preferably is a compound present in a suitable amount, as the skilled artisan will appreciate, determined from (without limitation) reference to the Examples herein and existing phase diagrams, such as FIGS. 3–4. Preferably it is provided as a particulate or pulverulent (e.g., powder) having a particle size less than about 10 microns and having a purity of about 99.9% by weight of the oxide. By way of example one suitable commercially available compound is $Gd_2O_3$ available from Alfa under the trade designation REO.

The alpha silicon nitride starting material preferably is provided as a particulate or pulverulent (e.g. powder) having an average particle size ranging from about 0.1 micron to about 2.0 microns, and more preferably from about 0.2 micron to about 1.2 microns. In one embodiment, the alpha silicon nitride is a powder, such as that available commercially from Ube, Inc. (Japan), under the designation UBE-10, and other manufacturers such as Hermann C. Stark (Germany) and Founder Ceramics (China). Other forms of alpha silicon nitride may also be used. The alpha silicon nitride preferably is present in the starting materials in a suitable amount. In one preferred embodiment, the powder has a purity of about 95% by weight alpha silicon nitride, and is present in an amount of about 60% to 80% by weight of the total ingredients, and more preferably about 70 to about 78% by weight.

The aluminum nitride, also present in a suitable amount, is provided as a particulate or pulverulent (e.g., powder)

having a particle size of about submicrons. In one embodiment, the aluminum nitride is a powder, such as that commercially available from (Japan) under the designation MAN-05. The powder has a purity of about 98% by weight aluminum nitride, and is present in an amount of about 10% to 20% by weight of the total ingredients, and more preferably about 10 to about 15% by weight.

The alumina, also present in a suitable amount, is provided as a particulate or pulverulent (e.g., powder) having a particle size of less than about 1 micron. A suitable powder of alumina is available commercially from Sumitomo, Inc. (Japan), under the designation AKP50. In one preferred embodiment, the powder has a purity of greater than about 99.9% by weight alumina, and is present in an amount of about 1 to 5% by weight of the total ingredients, and more preferably about 1 to about 4% by weight.

The starting materials optionally may be of larger or smaller average particle size and may include one or more additives or agents in addition to the foregoing. For instance, suitable amounts of an appropriate sintering aid may be added (e.g., as required primarily in the alpha prime SiAlON phase region).

With all starting materials herein, it will be recognized that some impurities may be present and tolerable up to certain amounts (depending primarily upon the ultimate application) as the skilled artisan will appreciate. In addition, silicon nitride and aluminum nitride powders typically contain some oxygen, and its amount can be incorporated in the composition determination, as the skilled artisan will appreciate.

All of the starting materials are admixed or blended together in one or more steps to form a substantially uniformly distributed powder admixture. The step or steps of admixing may employ any suitable method, including one or more of wet mixing or dry mixing methods. Preferably, a wet mixing method is employed. For example, the starting materials are placed in a container (e.g., milling jar) with a suitable liquid medium (e.g., isopropyl alcohol). Any suitable amount of liquid medium may be employed. For example, one such suitable amount of liquid medium occupies about 90 volume percent relative to the volume of the powder admixture. A suitable milling media (e.g., silicon nitride, corundum, zirconia, or agate milling balls having an average size of about 2 to about 4 mm) is also placed in the container. The starting materials are attrition milled for a suitable time (e.g., about 2 hours). After milling, the container is opened and the liquid medium is evaporated, such as by air drying or heating to a temperature of about 85° C. for a suitable time (e.g., about 2 to about 5 hours), the heating being preferred. The admixture may be stored, preferably contained in a suitable container, such as a polyethylene bottle.

After drying, the admixture is sifted and can be densified. In one embodiment, the admixture is first isostatically cold-pressed in a suitable die to form a green body. Preferably one or more pressures are applied to the admixture during cold pressing, using any suitable technique. The pressure ranges from about 150 to about 300 MPa, and more preferably about 250 MPa. The load is maintained for any suitable time to achieve the desired density. For instance, times as low as about 1 minute may be employed. The purpose of this cold-pressing step is to achieve a green density of about 50 to 60% of theoretical density. Optionally, this cold pressing step may be deleted and the admixture may be hot pressed or otherwise fired without it.

After cold pressing (when employed), the cold-pressed admixture is transferred to a suitable furnace, such as a graphite resistance furnace, for firing. Any suitable pressing and firing technique may be employed, such as (without limitation) pressureless sintering, gas pressure sintering, hot pressing or hot isostatic pressing.

It is preferred that firing take place in a substantially static and inert atmosphere (e.g., substantially static or slow flowing nitrogen gas). The holding time at the firing temperature may vary depending on techniques employed, but typically involve times ranging from about 2 hours to about 3 hours. Shorter or longer times may be employed, as the skilled artisan would appreciate. Temperatures and pressures also may vary outside of the specified ranges but still achieve a material within the scope of the present invention. Temperatures will range from about 1750 to about 1800° C. Preferably, regardless of the technique employed, the dies coming into contact with the fired material will be made of a suitable material that will not react with the starting materials. For instance, a graphite die may be employed. The graphite die may have a light coating (e.g., a coating thickness of about 1 mm for a die having dimensions of about 20 mm by about 5 mm) of boron nitride powder, or a like material for reducing bonding of the pressed material to the die during firing at elevated temperatures. A BN—$Si_3N_4$—AlN mix-powder-bed in a graphite (or boron nitride) crucible with a threaded cap is preferred to be used for sintering.

The admixture is placed in a suitable furnace (e.g., a graphite resistance furnace) and the furnace is heated to the appropriate temperature range while a suitable pressure is applied (if applied) to the admixture.

As the skilled artisan will appreciate, for techniques involving pressure application, such as hot pressing, the firing step may involve applying pressure during one or more heating stages, such as by heating to a first predetermined temperature, pressing and holding for a predetermined time, and then heating further to a second predetermined temperature, and holding it there for a predetermined time for densification.

For hot pressing, in one illustrative preferred embodiment, one or more pressures ranging from about 20 to about 30, and more preferably about 25 MPa, are applied during a heating stage at a temperature about 1600° C., and then preferably about 1750–1800° C. for densification. Preferably the pressure is maintained for about 1 to about 3 hours.

In a preferred embodiment, for gas pressure sintering, the materials are heated at one or more temperatures in the range of about 1800° C. to about 1950° C., and nitrogen gas is applied in an overpressure ranging from about 10 atm to about 20 atm for about 2 to about 3 hours. To illustrate, without limitation, one preferred firing method includes a two-stage gas pressure sintering where, in the first stage, the admixture is heated at a temperature of about 1700° C. for about 1 hour under about 5 atm nitrogen gas overpressure, followed thereafter by heating at a temperature of about 1800° C. for about 2–3 hours under about 20 atm nitrogen gas overpressure. In another illustrative embodiment, the material may be gas pressure sintered at a temperature of about 1800–1950° C. for about 2 hours. As the above indicates, in a preferred embodiment, the process for making the material of the present invention advantageously does not require overpressures greater than about 20 atm.

Preferably the firing conditions are selected and employed so as to achieve a density of at least about 97 to about 99%, and more preferably at least about 99% of theoretical density.

The above combination of steps is selected to yield a resulting structure that is believed to directly increase the hardness and toughness of the novel materials of this invention as compared with conventional silicon nitride materials, particularly those employing alpha silicon nitride as a starting material.

The resulting material is then machined to a suitable configuration for the intended application. For instance, the material may be machined using conventional techniques, such as using a diamond tool (e.g., a wheel). The resulting material may also be analyzed and tested.

As will be appreciated, while one preferred article according to the present invention is a cutting tool (which is used to contact a workpiece and remove material therefrom), other articles requiring wear resistance likewise may be made using the processes and materials of the present invention, such as those identified previously in the "Discussion" section.

EXAMPLES

Materials having the starting compositions of Table I are prepared and analyzed to yield the information of Tables II and III. The starting materials of Table I are attrition milled in isopropyl alcohol for about two hours using a $Si_3N_4$ milling medium in PTFE/TEFLON™-coated container. Dried and sifted powders are cold isostatically pressed at a pressure of about 250 MPa to a density of about 50 to about 60% of theoretical. Gas pressure sintering is employed. The materials are vacuumized and then pressed in a nitrogen gas (i.e., about 0.2 MPa to about 0.5 MPa, particularly the latter at higher temperature) as the temperature of the system is increased to about 1700 to about 1750° C. Upon reaching such temperature, the materials are held there for about 15 to about 30 minutes and then pressed in nitrogen gas to a pressure of about 2 MPa. The temperature is raised to about 1800 to about 1950° C., and the materials are held there under a pressure of about 2 MPa for two to three hours.

Like results are obtained by using different modifying cations or combinations of cations (e.g., from Nd, Sm, Dy, Yb, and Y) or a pressureless sintering technique in lieu of gas pressure sintering. Under the latter approach, the materials are held at about 1800° C. for at least three hours.

TABLE I

Nominal Compositions (wt %) of Samples Containing α' (Gd)-SiAlON[1]

| I.D. NO. | $Si_3N_4$ | $Gd_2O_3$ | AlN | $Al_2O_3$ |
| --- | --- | --- | --- | --- |
| Gd0909 | 78.43 | 8.94 | 10.11 | 2.51 |
| Gd0912 | 76.09 | 8.94 | 10.78 | 4.19 |
| Gd1212 | 71.96 | 11.62 | 13.15 | 3.27 |
| Gd1209 | 74.25 | 11.63 | 12.49 | 1.64 |
| Gd13509 | 72.22 | 12.92 | 13.64 | 1.21 |

[1]α-$Si_3N_4$ is supplied commercially by Ube, Inc. under the trade designation UBE-10; also by Founder Ceramics Inc. (China).
$Gd_2O_3$ is supplied commercially by Alfa under the trade designation REO.
AlN is supplied commercially by Mitsui Inc. under the trade designation MAN-0.5.
$Al_2O_3$ is supplied commercially by Sumitomo Inc. under the trade designation AKP50.

TABLE II

Properties of tough α'(Gd)-SiAlON composites*

| Name** | $H_v$ (GPa) | $K_{1c}$ (MPa·m$^{0.5}$) | $\sigma_{R.T.}$ (MPa) | Phases (%)*** α'/β' | |
| --- | --- | --- | --- | --- | --- |
| Gd0909 | 19.3 | 6.5 | 530 | 47.2 | 52.8 |
| Gd0912 | 19.0 | 5.0 | 630 | 54.7 | 45.3 |

TABLE II-continued

Properties of tough α'(Gd)-SiAlON composites*

| Name** | $H_v$ (GPa) | $K_{1c}$ (MPa·m$^{0.5}$) | $\sigma_{R.T.}$ (MPa) | Phases (%)*** α'/β' | |
| --- | --- | --- | --- | --- | --- |
| Gd1212 | 20.0 | 6.7 | 770 | 82.5 | 17.5 |
| Gd1209 | 19.4 | 5.2 | 745 | 100 | — |
| Gd13509 | 20.7 | 4.5 | — | 100 | — |

*α': α(R)-SiAlON, β': β-SiAlON, both with elongated grains.
**Gd1209: α'(Gd)-SiAlON composition with m = 1.2, n = 0.9.
Gd13509 with m = 1.35, n = 0.9, according to the formula: $R_{m/3}Si_{12-(m+n)}Al_{(m+n)}O_nN_{16-n}$.
***α'/β' ratio measured from X-ray.

TABLE III

α'(Gd)-SiAlON Formulae

| NO. | Formula |
| --- | --- |
| Gd0909 | $Gd_{0.3}Si_{10.2}Al_{1.8}O_{0.9}N_{15.1}$ |
| Gd0912 | $Gd_{0.3}Si_{9.9}Al_{2.1}O_{1.2}N_{14.8}$ |
| Gd1212 | $Gd_{0.4}Si_{9.6}Al_{2.4}O_{1.2}N_{14.8}$ |
| Gd1209 | $Gd_{0.4}Si_{9.9}Al_{2.1}O_{0.9}N_{15.1}$ |
| Gd13509 | $Gd_{0.45}Si_{9.75}Al_{2.25}O_{0.9}N_{15.1}$ |

What is claimed is:
1. A method for cutting an article, the method comprising:
   (a) contacting a workpiece with a cutting tool, said cutting tool having a surface for contacting the workpiece, said surface including a ceramic material having:
      (i) an alpha prime SiAlON phase present in an amount greater than any other phase in said ceramic material and prepared from an alpha silicon nitride starting material present in a starting material in a major amount;
      (ii) a hardness (Vickers) of at least about 19 GPa;
      (iii) an indentation toughness of at least about 5 MPa•m0.5;
   said alpha prime SiAlON phase including a plurality of elongated rod shape α'(R)-SiAlON grains having an average grain diameter of approximately 0.5 to about 2.5 microns and an average aspect ratio of at least about 6:1, where R is a modifying cation selected from the group consisting of Nd, Sm, Gd, Dy, Yb, Y, and mixtures thereof and said grains have the formula $R_{m/3}Si_{12-(m+n)}Al_{(m+n)}O_nN_{16-n}$, where m ranges from about 0.9 to about 3.2 and n ranges from about 0.4 to about 1.8; and
   (b) removing material from the workpiece with the cutting tool.

2. The method according to claim 1, wherein the modifying cation is a cation of Yb, m ranges from about 2.7 to about 3.2 and n ranges from about 1.3 to about 1.8.

3. The method according to claim 2, wherein m ranges from about 2.7 to about 3.0.

4. The method according to claim 2, wherein n ranges from about 1.4 to about 1.6.

5. The method according to claim 1, wherein said modifying cation is a cation of Gd.

6. The method according to claim 1, wherein said modifying cation is a cation of Sm.

7. The method according to claim 1, wherein said modifying cation is a cation of Nd.

8. The method according to claim 1, wherein said modifying cation is a cation of Dy.

9. The method according to claim 1, wherein said modifying cation is selected from Yb.

10. The method according to claim 1, wherein said modifying cation is a cation of Y.

11. The method according to claim 1, wherein the modifying cation is selected from a cation of Nd, Gd, and mixtures thereof, m ranges from 0.9 to about 1.35, and n ranges from about 0.9 to about 1.2.

12. The method according to claim 1, wherein the modifying cation is Gd, m ranges from 1.6 to about 2.4, and n ranges from about 0.9 to about 1.2.

13. The method according to claim 12, wherein m ranges from about 1.8 to about 2.2.

14. The method according to claim 1, wherein said ceramic material has a hardness (Vickers) of at least about 20 GPa.

15. The method according to claim 1, wherein said ceramic material has a indentation toughness of at least about 6.0 MPa•m½.

16. The method according to claim 1, wherein said ceramic material has a indentation toughness of at least about 6.5 MPa•m½.

17. The method according to claim 1, wherein said ceramic material has a indentation toughness of at least about 7 MPa•m½.

18. The method according to claim 1, wherein a majority of the α'(R) SiAlON grains have a grain diameter of approximately 0.5 to about 1.5 microns.

19. The method according to claim 1, wherein a majority of the α'(R) SiAlON grains have a grain diameter of at least about 1.0 microns.

20. The method according to claim 1, wherein a majority of the α'(R) SiAlON grains have a grain diameter of at least about approximately 1.0 microns.

21. The method according to claim 1, wherein a plurality of said α'(R) SiAlON grains have an aspect ratio of at least about 7:1.

22. A method for making a ceramic article, the method comprising:
    (a) providing starting materials, including:
       (i) silicon nitride;
       (ii) aluminum nitride;
       (iii) alumina; and
       (iv) $Gd_2O_3$; and
    (b) applying heat and pressure to said starting materials for forming a resulting material having:
       (i) alpha prime SiAlON present in an amount greater than 45% by weight of the overall material, and having the formula $Gd_{m/3}Si_{12-(m+n)}Al_{(m+n)}O_nN_{16-n}$, with m ranging from 0.9 to about 1.35, 1.6 to about 2.4 or mixtures thereof and n ranging from about 0.9 to about 1.2;
       a hardness (vickers) of at least about 19.0 GPa;
       (iii) a toughness ($K_{IC}$) of at least about 5.0 MPa•m0.5;
       (iv) a room temperature strength of greater than about 500 MPa.

23. The method according to claim 22, wherein said room temperature strength is greater than about 800 MPa.

24. The method according to claim 22, wherein the starting materials are present in the following amounts:
    (a) about 60 to about 80 parts by weight alpha silicon nitride;
    (b) about 10 to about 20 parts by weight AlN;
    (c) about 1 to about 5 parts by weight $Al_2O_3$; and
    (d) about 9 to about 13 parts by weight $Gd_2O_3$.

25. The method according to claim 22, wherein said silicon nitride is alpha silicon nitride.

26. The method according to claim 22, wherein said silicon nitride is beta silicon nitride.

27. A method for making a ceramic article, the method comprising:
    (a) providing an alpha silicon nitride starting material in a major amount of the overall starting materials;
    (b) densifying said starting material to form a ceramic body having:
       (i) a first phase present in an amount of at least about 45% by weight of said material, including a plurality of alpha prime SiAlON elongated grains having a majority of said grains present with an average grain diameter of at least about 0.5 microns and an aspect ratio greater than about 6:1;
       (ii) a second phase including a phase selected form the group consisting of glass phase, beta SiAlON, AlN polytypoids, melilite, garnet and mixtures thereof;
    said alpha prime SiAlON grains having the formula $R_{m/3}Si_{12-(m+n)}Al_{(m+n)}O_nN_{16-n}$, with m ranging from about 0.9 to about 3.2 and with n ranging from about 0.4 to about 1.8, and where R is a cation of an element selected from the group consisting of Nd, Sm, Gd, Dy, Yb, Y, and mixtures thereof.

28. The method according to claim 27, wherein said first phase is present in amount greater than about 55% by weight of the final material.

29. The method according to claim 27, wherein said first phase is present in amount greater than about 70% by weight of the final material.

30. The method according to claim 27, wherein said first phase is present in amount greater than about 90% by weight of the final material.

31. The method according to claim 27, wherein the relative amount of said first phase to said second phase is about 4 to about 5 parts by weight of said first phase to about 1 part by weight of said second phase.

32. The method according to claim 27, wherein the weight ratio of said first phase to said second phase is about 80:20.

* * * * *